United States Patent [19]

Johnson et al.

[11] 4,178,067
[45] Dec. 11, 1979

[54] SPLICING OPTIC WAVEGUIDES BY SHRINKABLE MEANS

[75] Inventors: Tore R. Johnson, Harrisburg; Emerson M. Reyner, II, Palmyra; Roman S. Slysh, Hershey, all of Pa.

[73] Assignee: AMP Incorporated, Harrisburg, Pa.

[21] Appl. No.: 870,558

[22] Filed: Jan. 19, 1978

[51] Int. Cl.² .............. G02B 5/14; F16L 25/00; B65H 69/02
[52] U.S. Cl. .............. 350/96.21; 285/DIG. 10; 156/158
[58] Field of Search .............. 350/96.20, 96.21; 285/DIG. 10, 381; 156/158, 49, 86; 29/447

[56] References Cited

U.S. PATENT DOCUMENTS

| | | | |
|---|---|---|---|
| 2,774,812 | 12/1956 | Clark | 339/DIG. 1 |
| 2,992,457 | 7/1961 | Harrison | 156/86 X |
| 3,198,059 | 8/1965 | Phaneuf et al. | 350/96.24 |
| 3,455,625 | 7/1969 | Brumley et al. | 350/96.22 |
| 3,734,594 | 5/1973 | Trambarulo | 350/96.21 |
| 3,758,916 | 9/1973 | Wetmore | 29/447 |
| 3,768,146 | 10/1973 | Braun et al. | 350/96.21 |

*Primary Examiner*—Rolf G. Hille
*Attorney, Agent, or Firm*—Gerald K. Kita

[57] ABSTRACT

A mass of dimensionally unstable material in cylindrical form is radially shrunk and confined within an outer sleeve of dimensionally stable material. Two ends of optic waveguides are inserted into a bore provided axially through the unstable material. Upon causing the unstable material to expand radially, the presence of the outer sleeve forces the unstable material to compress and grip radially upon the waveguides, thereby urging them into colinear alignment.

3 Claims, 7 Drawing Figures

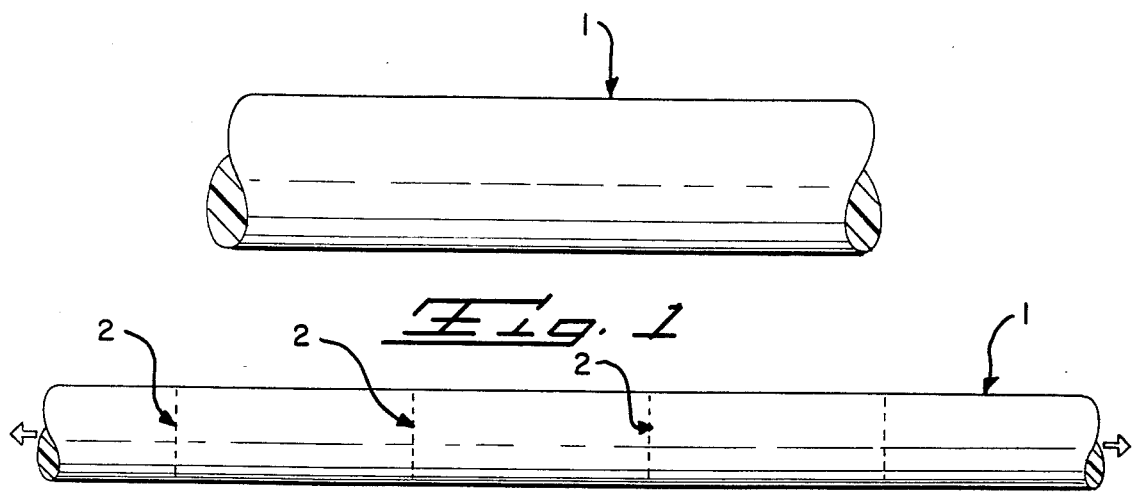
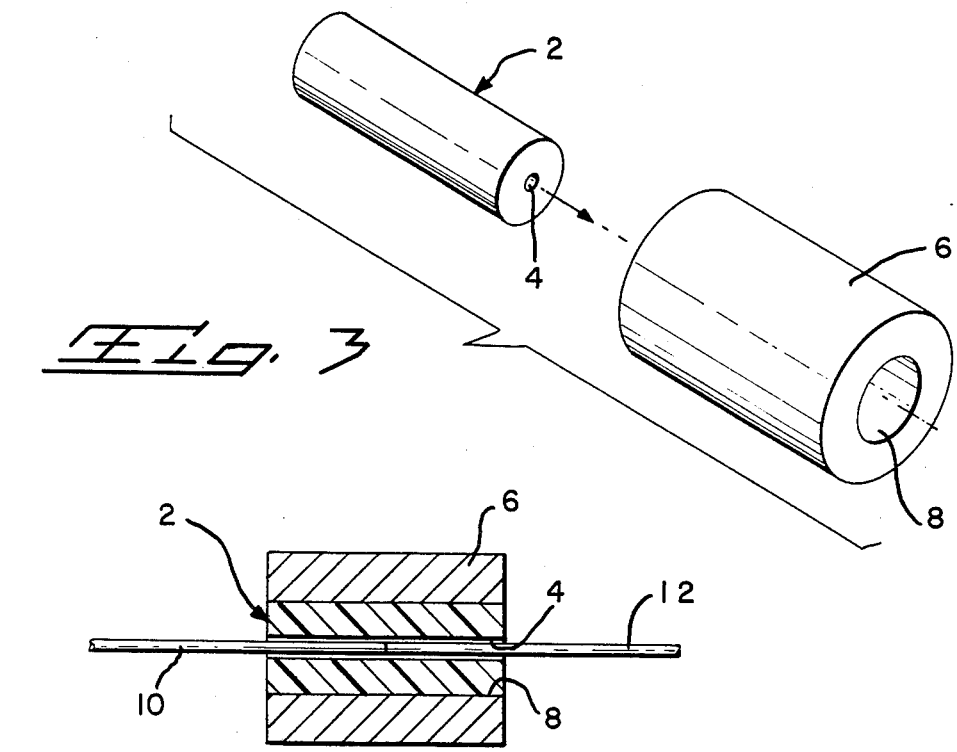
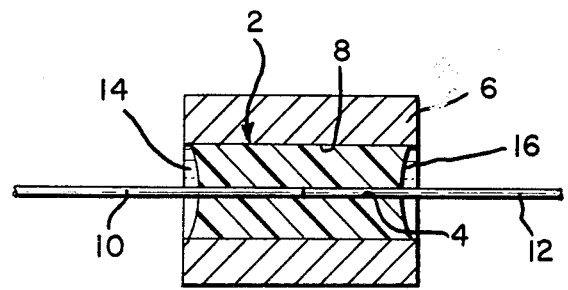

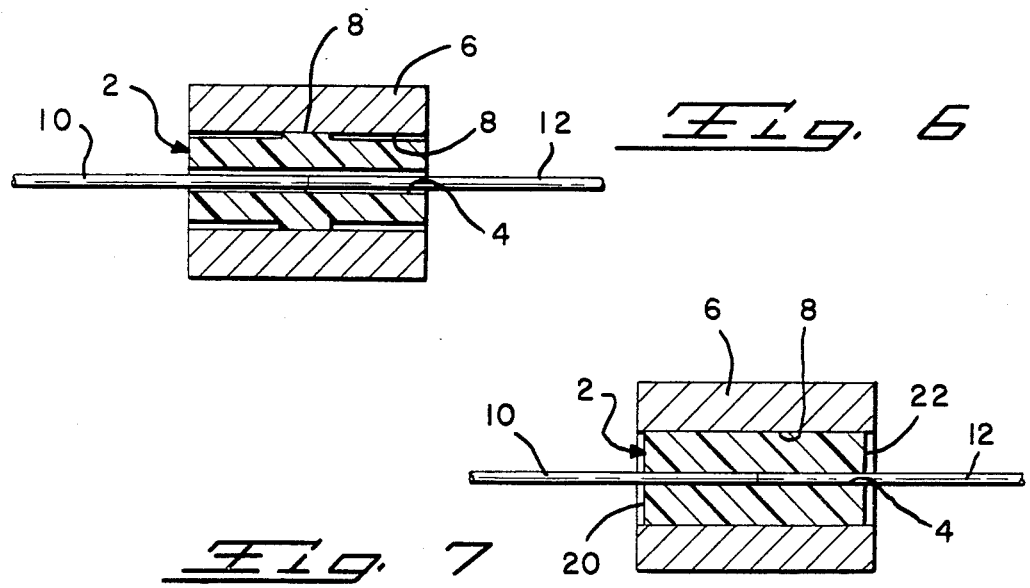

SPLICING OPTIC WAVEGUIDES BY SHRINKABLE MEANS

BACKGROUND OF THE INVENTION

This invention relates to use of dimensionally unstable materials which undergo a predictable and controlled change in shape under certain conditions. By confining such a material, large residual forces are developed as the material strains to undergo a change in shape. These residual forces are utilized to grip and align waveguides which are to be colinearly spliced end to end.

One suitable material comprises any of the noncrosslinked or crosslinked polymers, or copolymers such as, polyethylene, polyvinyl, chloride, and polyolefins, which are described in representative U.S. Pat. Nos. 3,359,193; 3,370,112, and 3,616,363. Also useable are amorphous polymers, such as polystyrene, crystalling materials with a low degree of crystallinity, such as polyvinyl chloride, slightly crosslinked crystalline polymers and copolymers having high degrees of crystallinity, such as Nylon, polyethylene, Kynar, Valox. These are heated and then resiliently stretched, sometimes biaxially, then cooled. The polymers are dimensionally unstable in their stretched form. Upon the application of heat they recover their original unstretched shaped.

BRIEF DESCRIPTION

A body of heat recoverable material of cylindrical form is heated and stretched axially, then cooled. As a consequence, the body is reduce in radial dimension. An axial bore is provided in the body which receives two optical waveguides end to end. The radially reduced body is confined within an outer cylindrical sleeve of dimensionally stable material which may include, metal, glass, or any stable polymeric material. When heated, the body will attempt to expand radially. However, due to confinement within the outer sleeve, the body instead will radially collapse the axial bore, forcing the waveguides into colinear alignment. Axial shrinkage of the body also occurs to urge the waveguides into close proximity end to end.

OBJECTS

An object of the present invention is to provide a splice for optic waveguides using a confined dimensionally unstable material to grip and colinearly align the waveguides.

Another object of the present invention is to provide an optic waveguide splice utilizing an axially stretched and radially shrunk body of dimensionally unstable material which is confined within an outer sleeve and which encircles a pair of waveguides disposed end to end, whereby the body is forced to grip and colinearly align the waveguides when a change in shape of the body is effected.

Another object of the present invention is to provide a method for splicing a pair of optic waveguides by encircling the waveguides with a dimensionally unstable material and by confining the material as it attempts to change shape thereby developing residual forces for radially gripping the waveguides.

Another object of the present invention is to provide a method and means for splicing optic waveguides end to end by encircling the waveguides with a dimensionally unstable material, which undergoes axial shrinkage and which also undergoes radial compression to urge the waveguides toward each other and to provide radial compression upon the waveguides.

Other objects and many additional advantages of the present invention will become apparent from the following detailed description and the accompanying drawings.

FIGS. 1 and 2 each comprises an enlarged elevation of a cylindrical body of suitable material which may be axially stretched and radially shrunk as shown in FIG. 2 to provide a dimensionally unstable body of cylindrical form which will recover its original form shown in FIG. 1.

FIG. 3 is an enlarged perspective, with parts exploded, illustrating a section of the body of FIG. 2 inserted within an outer sleeve.

FIG. 4 is an enlarged elevation in section of the assembly shown in FIG. 3 together with two ends of optical waveguides located within a small diameter bore of the dimensionally unstable body.

FIG. 5 is an enlarged elevation in section similar to FIG. 4 illustrating a complete optic waveguide splice with the dimensionally unstable body being axially shrunk and radially compressed on the waveguides.

FIGS. 6 and 7 are enlarged elevations in section of a modification, wherein the dimensionally unstable body is provided with a radially enlarged central section prior to receovery to its original shape and thereby completing the splice as shown in FIG. 7.

DETAILED DESCRIPTION

With more particular reference to the drawings there is illustrated generally at 1 in FIG. 1 a cylindrical mass or body of polymeric or other suitable material which is capable of deformation to a different shape, and then, under certain conditions, being capable of recovery to its original shape. If the material of the body is heat recoverable, the body may be heated and then axially stretched from its cylindrical form shown in FIG. 1 to its elongated cylindrical form shown in FIG. 2. Upon cooling the stretched body will be dimensionally unstable in its stretched configuration. When the body 1 is axially stretched it also undergoes a corresponding radial reduction. The radially reduced body may be cut into right cylindrical sections 2. As shown in FIG. 3, each of the sections is provided with an axial relatively small diameter bore 4 therethrough which is coincident with the longitudinal central axis of the corresponding section 2. Each section 2 thereby is formed to a thick sleeve configuration.

As further shown in FIG. 3 in conjunction with FIG. 4, each body section 2 is then asembled within a sleeve 6 of dimensionally stable material such as metal glass, or polymeric material. The inner diameter 8 of the sleeve is of a dimension complementary to the body section 2 for a snug fit or a press fit; all that is necessary for retention of the assembled parts.

The two end portions 10, 12 of optic waveguides are to be spliced together in end to end relationship, and are inserted into opposite ends of the bore 4. As shown in FIG. 4, a substantial clearance between the waveguides and the sidewall of the bore 4 is provided for ease in assembly of the waveguides in the bore.

Prior to insertion in the bore, the waveguides are prepared or "dressed" according to standard procedure. For example, in some types of waveguides it is necessary to remove a portion of the cladding material of selected refractive index. In other types, removal of the cladding is not necessary. Either type waveguides may be spliced by practice according to the present invention. However, if cladding is removed, the body material 2 must be selected with a suitable refractive index complementary to the cladding. Alternatively, the interior of the bore 4 may be coated with a thin layer, (not shown) of material having a suitable refractive index. In the preferred embodiment shown in the drawings, it is assumed that 10 and 12 do not require removal of their cladding.

To complete the splice, necessary conditions are effected to cause recovery of the body section 2 in the sleeve 6 to its original form. More specifically it is desired that the body 2 will tend to recover to the radially expanded configuration shown in FIG. 1. If the body 2 is of a heat recoverable material then the application of heat is necessary. FIG. 5 illustrates the body section 2 in an attempt to expand radially and contract axially upon the application of heat. However, since it is confined within the outer sleeve 6 radial expansion is prevented. Instead the unstable material is forced to compress upon itself radially collapsing the bore 4. By confining the body section within the sleeve, large residual forces are developed as the material strains to undergo a change in shape. These residual forces urge the unstable material to compress and grip radially upon the waveguides thereby urging them into colinear alignment. The waveguides 10 and 12 thereby are radially surrounded and gripped and thereby retained in the assembly.

Also in FIG. 5 the body 2 forms concave end portions 14 and 16 which become retracted slightly a short distance within the bore 8. This indicates that axial shrinkage of the body also occurs. Thereby in addition to radial forces upon the waveguides, axial forces are also applied, tending to urge the waveguides toward each other and into close proximity end to end. This minimizes loss of light signals which emerge from one end of one waveguide for transfer across the splice to the other waveguide.

EXAMPLE 1

A clear copolymer of propylene and vinyl chloride identified by the trade name "STA-FLOW 2025" was utilized as the body section 2 having an outer reduced or shrunken diameter of 0.125 inches and a length of 0.318 inches. The body included a coaxial bore 4 of 0.0145 inches diameter. The body was press fit within a polytetrafluroethylene sleeve having an outer diameter of 0.25 inches and a length of 0.318 inches. Waveguides 10 and 12 each having an outer diameter of 0.010 inches were located in the bore of the body 2. The assembly was then heated at 315° F. for five minutes and then cooled. Upon inspection the body 2 was found to have recovered a length of 0.303 inches, indicating a change in length of −0.015 inches. The diameter of the body 2 expanded 2.128 inches which indicated that the sleeve also expanded to accommodate expansion of the body 2. The waveguides were found to be colinearly aligned and sufficiently radially gripped to prevent pull out from the assembly. However, retention in the assembly was substantially lower than the tensile strength of the waveguides. Therefore, it was concluded that the waveguides should be anchored externally of the splice to resist inordinate tensile forces on the waveguides. This requirement is unrelated to the quality of alighnment provided by the splice. A similarity exists in electrical wiring, for example, wherein the wires are mechanically anchored by fastening means externally of and unrelated to an electrical splice.

Since the sleeve underwent expansion it was concluded that the outer sleeve need not be totally rigid and inexpansible. It is only necessary that the outer sleeve confine or resist a tendency for radial expansion of the body 2 an amount sufficient to produce effective radial forces upon the waveguides. Some of the radial expansion of both the sleeve and the body 2 occurs because of thermal expansion. During initial heating, very little thermal expansion occurs while most of the unstable recovery expansion of the body 2 occurs. As the assembly elevates in temperature, both the sleeve and the body 2 will enlarge radially, determined by their respective coefficients of thermal expansion. To prevent relaxation of gripping forces on the inserted waveguides, it is desired to limit thermal expansion of the outer sleeve. This can be done by allowing some enlargement of the sleeve by the expanded body, as was accomplished in example 1. Also, it is desirable to reduce the temperature required to stretch and thereafter to recover the original shape of the body 2. Particles of carbon or metal impregnated into the body 2 improve the heat gain thereof to reduce both the time required for the application of heat and the temperature attained by the outer sleeve.

Another factor believed important to the operation of the invention is the lubricity of polytetraflurolthylene reducing the sliding friction which would normally resist axial shrinkage of the body 2 when heated.

EXAMPLE 2

FIGS. 6 and 7 illustrate a modification whereby the outer sleeve 6 was fabricated from brass having the same dimensions as the sleeve of Example 1. The body 2 in FIG. 6 was also fabricated from STA-FLOW 225, and in its reduced radial configuration had an outer diameter of 0.125 inches. A central enlarged collar section 18 having an axial length of 1/16 inches was provided by machining the end portions of the body 2 to an outer diameter of 0.122 inches. Upon applying heat to recover the original shape of the body 2, FIG. 7 illustrates that the central bore 4 collapsed radially upon the waveguides 10 and 12 as desired. In addition, sufficient radial expansion of the body section 2 occurred to completely fill the internal bore 8 of the brass sleeve 6. The ends 20 and 22 of the body 2 were found to be recessed within the bore 8 showing that the desired axial shrinkage also occurred. Since the brass sleeve would ordinarily produce greater friction than would polytetrafluoroethylene, the initial reduction in diameter of the body section was found to eliminate frictional resistance to shrinkage of the body. It was also observed that the end portions 20 and 22 more nearly retained a right cylindrical configuration rather than the concave configurations observed in conjunction with example 1. The absence of friction provided by the clearance between the body ends and the sleeve, as well as the greater expansion allowed by the clearance enhances adequate axial movement of the body 2.

Although a preferred embodiment and a modification thereof are described and illustrated in detail, other modifications and embodiments which would be obvious to one having skill in the art is intended to be covered by the spirit and scope of the appended claims.

What is claimed is:

1. An optic waveguide splice, comprising:

an outer, dimensionally stable sleeve containing a mass of dimensionally unstable material;

a pair of optical waveguides received into opposite ends of a reduced diameter bore extending axially through said mass and having an initial diameter sufficient to receive freely the ends of said waveguides therein;

said mass adapted for axial shrinkage and radial volumetric expansion against said stable sleeve and inwardly in compression against said waveguides to move the ends thereof into adjacent colinear axial alignment.

2. A method for splicing two optic waveguides in colinear axial alignment, comprising the steps of:

inserting a mass of dimensionally unstable material within a dimensionally stable sleeve, inserting ends of waveguides to be spliced into a reduced diameter axial bore of said mass, with the diameter of said axial bore being sufficient to freely receive said waveguides;

causing said mass to shrink axially and expand radially and tightly against the inner periphery of said sleeve and tightly in compression over said waveguides; and, urging at least the ends of said waveguides by said radial expansion to move into adjacent colinear axial alignment.

3. In an optical splice wherein the ends of two axially colinear optic waveguides are radially gripped by a surrounding sleeve form member, the improvement comprising:

said sleeve form member being in the form of a dimensionally unstable mass of material which is axially shrinkable and radially expansible in response to the application of heat thereto;

said member including a central axially extending opening therethrough of a diameter sufficient to freely receive therein said ends of said waveguides;

an outer sleeve of a material which dimensionally expands and contracts in response to corresponding changes in temperature snuggly receiving said dimensionally unstable mass therein; and said mass being shrunken axially and expanded radially tightly against the inner periphery of said sleeve;

said mass having its radial outward expansion limited by the expansion and contraction of said outer sleeve and being radially inwardly expanded to reduce the width of said opening.

said waveguides being urged into colinear axial alignment by said radial expansion, and said mass compressably encircling said waveguides.

* * * * *